United States Patent
Schneeberger

[11] Patent Number: 5,197,372
[45] Date of Patent: Mar. 30, 1993

[54] DEVICE FOR THE PREPARATION OF HOT BEVERAGES BY EXTRACTION

[75] Inventor: Gerhard Schneeberger, Bulach, Switzerland

[73] Assignee: Prodiana AG, Switzerland

[21] Appl. No.: 734,196

[22] Filed: Jul. 22, 1991

[30] Foreign Application Priority Data

Jul. 23, 1990 [CH] Switzerland .................. 02432/90

[51] Int. Cl.⁵ .................................. A47J 31/00
[52] U.S. Cl. ............................. 99/287; 99/289 R
[58] Field of Search .......... 99/289 R, 289 D, 289 P, 99/289 T, 295, 279; 426/433

[56] References Cited

U.S. PATENT DOCUMENTS

| | | | |
|---|---|---|---|
| 3,483,811 | 12/1969 | Heier | 99/289 R |
| 3,824,913 | 7/1974 | Herman et al. | 99/287 |
| 4,271,752 | 6/1981 | Valente et al. | 99/289 R |
| 4,271,753 | 6/1981 | Neely | 99/289 R |
| 4,667,586 | 5/1987 | Harada et al. | 99/289 R |
| 4,709,625 | 12/1987 | Layre et al. | 99/289 R |
| 4,784,050 | 11/1988 | Cavalli | 99/289 R |
| 4,885,986 | 12/1989 | Grossi | 99/289 R |

FOREIGN PATENT DOCUMENTS

| | | | |
|---|---|---|---|
| 0154206 | 9/1985 | European Pat. Off. | 99/289 R |
| 0184561 | 6/1986 | European Pat. Off. | 99/289 R |
| 2912841 | 10/1979 | Fed. Rep. of Germany | 99/289 R |
| 3105124 | 8/1982 | Fed. Rep. of Germany | 99/289 R |
| 2447702 | 8/1980 | France | 99/289 R |
| 1575806 | 10/1980 | United Kingdom | 99/289 R |

*Primary Examiner*—Harvey C. Hornsby
*Assistant Examiner*—Reginald L. Alexander
*Attorney, Agent, or Firm*—Speckman & Pauley

[57] ABSTRACT

A device for preparing hot beverages such as coffee by extraction having an extraction cup (5) movable from an outset position to an extraction position along a control track (2) in a mounting plate (1) by a movable holder (4). The extraction cup (5) is detachably secured to the movable holder (4). The extraction cup (5) is filled from a coffee grinding unit (3) and is then displaced along the horizontal portion (2') of the control track (2) laterally until it is located vertically below an extraction piston (11), whereupon it moves vertically upward. In this manner, the ground coffee is compressed. Simultaneously, through a hot water inlet neck (8), communication with a hot water heater (10) is established. After the extraction, a stop (15) is displaced beneath a tappet (7) supported in the extraction cup (5) and keeps the tappet at the top of the extraction cup (5) during the downward motion of the extraction cup (5). In the ensuing return motion of the extraction cup (5) to the outset position, the cup moves beneath a scraper (16) that cleans the filter (6) and scrapes off the filter cake.

5 Claims, 2 Drawing Sheets

DEVICE FOR THE PREPARATION OF HOT BEVERAGES BY EXTRACTION

BACKGROUND OF THE INVENTION

Field of the Invention

The present invention relates to a device for the preparation of hot beverages by extraction, in particular for preparing coffee, having a beverage powder processing and metering unit, a hot water heater with a metering pump, and expulsion means for removing the used beverage powder from an extraction cup. Devices of this type are known in many forms, particularly for commercial use, and have proven excellent. The same type of devices for domestic use, however, with the same kind of ease of use have been available on the market only within the last few years. The previously known so-called espresso machines required an extraordinary amount of maintenance, which is an extreme disadvantage particularly for a consumer appliance. To guarantee satisfactory operation, two conditions are absolutely necessary, first, as few moving parts as possible, and second, simple cleaning of those parts that tend to become dirty.

These considerations were already taken into account in a device for making espresso coffee in accordance with German Published, Unexamined Patent Application DE-A-2912841. In this device, an extraction cup is used that is mounted stationary in the machine, while the powdered beverage processing and metering unit and the water heater are pivoted above the permanently mounted extraction cup. The filter cake is expelled by way of the low filter, which is guided into the extraction cup and is movable by a tappet. The expulsion of the filter cake from the lower filter is done passively, by a scraper on the pivotable brewing chamber. Besides the large mass that must be moved, there are also two components, which are active components, that must be moved, the control and actuation of which must accordingly be done at different positions. This kind of design is extremely complex and likely to need repairs.

By comparison, the device defining this generic type, in accordance with European Patent Application EP-A0,184,561, is considerably simpler in design and consequently less vulnerable to malfunction. In this device, the beverage powder processing and metering unit is permanently disposed in a housing, and the hot water heater and a metering pump are permanently mounted at different locations in the housing. The extraction cup moves only in a horizontal plane back and forth between the two units and to a third position, where expulsion means for removing the used beverage powder from the extraction cup are present. Although this device has already been considerably simplified over the previous one, nevertheless a large number of moving elements are still needed. The extraction cup must be pushed away from the powdered beverage processing and metering unit to the brewing station, and then moved by translation onward to the station in which the filter cake can be expelled by expulsion means, which additionally requires that the extraction cup be rotated; then, it must be rotated back again and moved back from the expulsion station to the metering unit. Other moving devices are needed for the upward and downward motion of the upper filter, which is conveyed into the extraction cup. A movable filter cake expeller is also needed. This latter provision can be achieved by a simple, passively actuated lever. However, removal of the extraction cup from the device to enable it to be cleaned is not readily possible. The complex guidance of the extraction cup does not allow simple removal thereof.

The device of European Patent Application EP-A-0,154,206 acknowledges that such devices require intensive maintenance. Correspondingly, it is proposed here that at least virtually all the parts of the device that are exposed to action by powdered beverage be combined into a structural unit that is detachably inserted into the housing of the device. Although this removable structural unit makes maintenance easier, it is still not suitable for the housewife performing the intermittently necessary cleaning of the filters. The parts combined into a structural unit must thus be replaced as a unit and sent to the factory for overhaul and cleaning. In this last version, the extraction cup is embodied by a piston/cylinder unit, which is movable up and down in its entirety, and is also pivotable.

SUMMARY OF THE INVENTION

It is consequently an object of this invention to provide a device for preparation of hot beverages by extraction, in particular for preparing coffee, having as few parts as possible to be actively moved, and in which both the extraction cup and the filters provided can be removed for cleaning without special assembly or disassembly.

This object is attained by a device for preparing hot beverages by extraction in accordance with this invention having a beverage powder processing and metering unit, a hot water heater with a metering pump and expulsion means for removing the used beverage powder from a movable extraction cup. The extraction cup is detachably secured to a movable holder which is guided in a control track both vertically and horizontally. A filter is displaceably supported in the extraction cup and a permanently mounted scraper is disposed outside the control track and between the end positions of the control track.

This and other objects and features of the invention will be more readily understood and appreciated from the description and drawings contained herein, the drawings showing the extraction cup, which is of particular importance, in four different positions.

DESCRIPTION OF PREFERRED EMBODIMENTS

Figure 1:
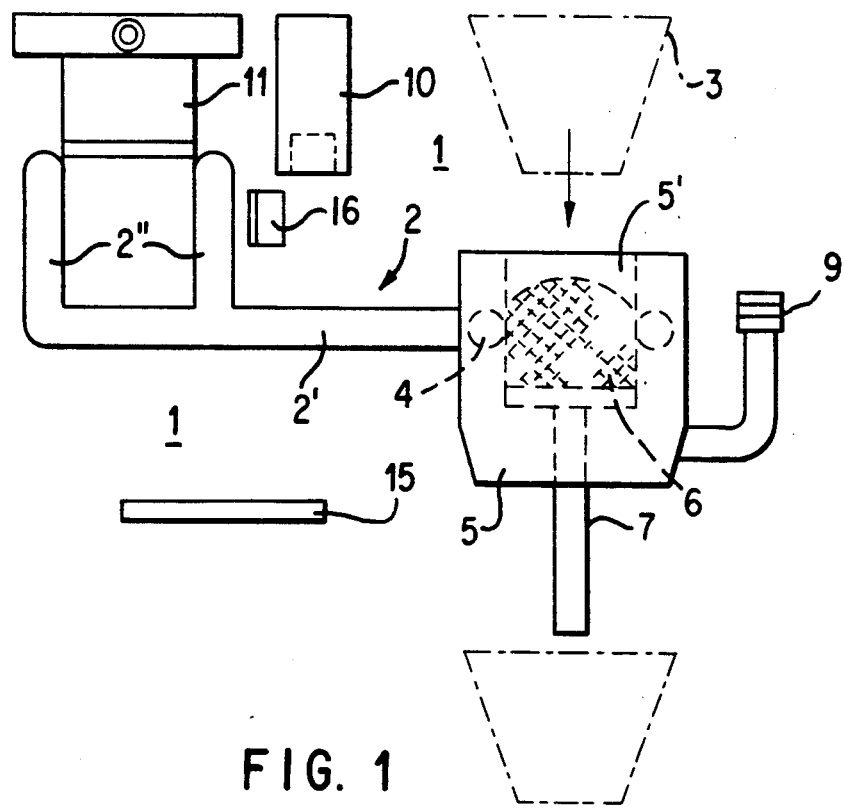
FIG. 1 is a plan view of the essential elements of one embodiment of this invention in an outset position of operation.

The device according to this invention is suitable for preparing hot beverages of any type that can be made from a powder or granulate with hot water by extraction. The device in accordance with one embodiment of this invention is used preferably to prepare coffee. In the ensuing description, the general terms of beverage powder and hot beverages will not be used, but instead only ground coffee and coffee will be referred to. In addition, only the parts essential to this invention are shown in the drawings, the known parts that are not essential being left out.

FIGS. 1-4 show a plan view of a mounting plate 1 into which a control track 2 has been cut. The control track 2 is in the shape of an L or F. Whether it is an L or an F depends solely on the shape of the movable holder 4. In accordance with one embodiment of this invention in which movable holder 4 comprises only one element, the control track 2 has the shape of an L. In accordance with another embodiment of this invention in which the movable holder 4 has two elements in alignment one behind the other with respect to the horizontal motion, the vertical portion 2,, of the control track 2 is double, and the overall control track has the shape of an F. However, even in the shape of an F, the movable holder 4 moves on only an L-shaped track. In accordance with another embodiment of this invention in which the movable holder 4 comprises a single element, the control track 2 may also have some other shape than that described. It is essential, however, that the holder execute a horizontal and a vertical motion, although these motions can occur simultaneously and be superimposed on one another, so that the control track has the form of an arc. In the example shown in FIGS. 1-4, the movable holder 4 is formed of two socket pins extending parallel to one another. An extraction cup 5 can simply be slipped onto these pins. This detachable connection guarantees simple removal of the extraction cup 5, should that be desired for cleaning purposes. In FIG. 1, the extraction cup 5 is shown in the outset position, and the movable holder 4 is in the extreme right-hand position in the control track 2. In this position, the extraction cup 5 is located precisely below a fill hopper that belongs to the powder processing unit 3. The powder processing unit may contain a supply container for coffee beans, a grinder mechanism, and a metering device. Many variant forms of such powder processing units are known in the prior art. While the extraction cup 5 is in the outset position, a predetermined quantity of ground coffee is introduced into the cavity 5' in the extraction cup 5. In this process, it is situated on a movable filter 6, which can be moved up and down in the cavity 5' of the extraction cup 5. A tappet 7 is provided for this purpose, penetrating the extraction cup bottom and acting upon the movable filter 6. The tappet 7 is sealingly supported in the extraction cup 5. The seal can be effected by means of an O-ring, although this is not shown in the drawing.

Figure 2:
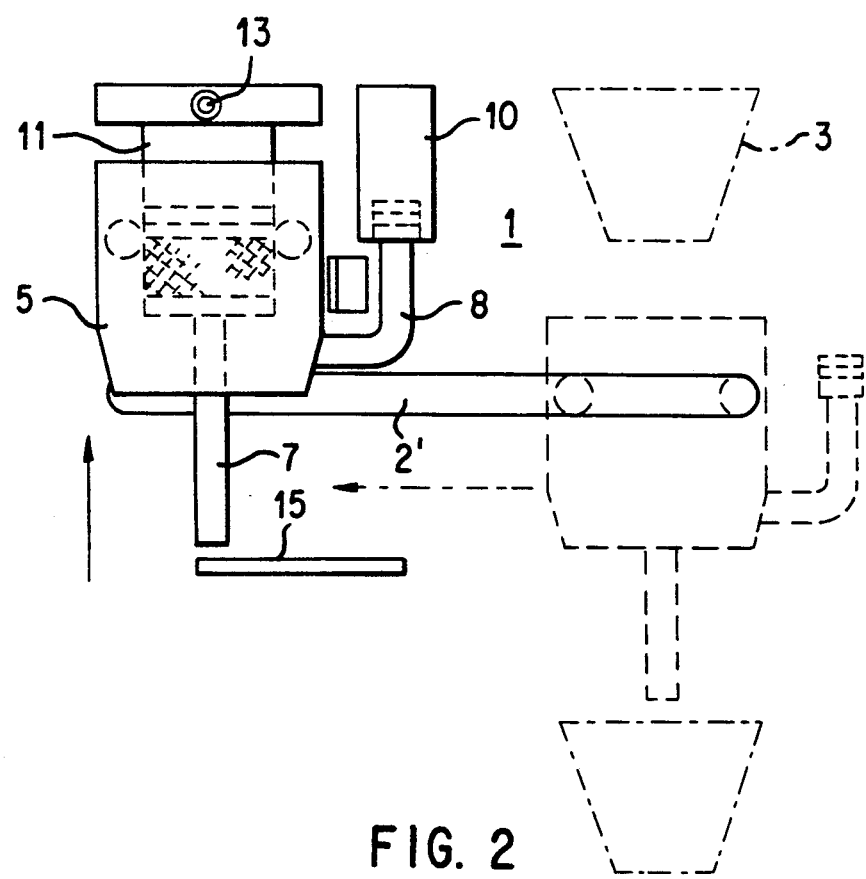
FIG. 2 is a plan view of the essential elements of the embodiment of this invention shown in FIG. 1 in an extracting position of operation.
Figure 3:
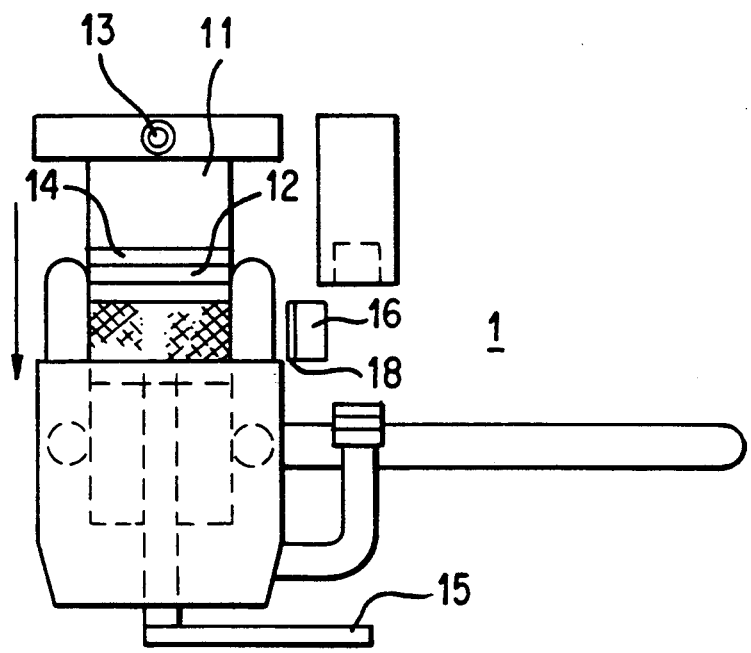
FIG. 3 is a plan view of the essential elements of the embodiment of this invention shown in FIG. 1 in a filter cake expulsion position.
Figure 4:
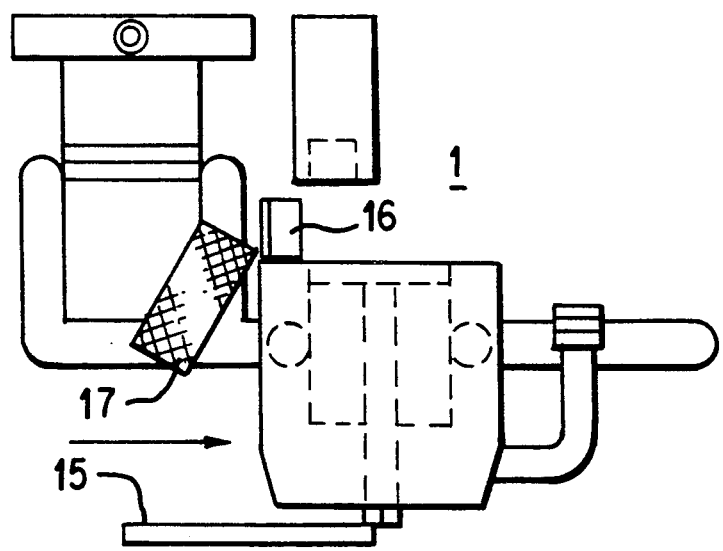
FIG. 4 is a plan view of the essential elements of the embodiment of this invention shown in FIG. 1 returning to the outset position, during scraping off of the filter cake.

Once the extraction cup 5 has been filled with the predetermined quantity of ground coffee, the movable holder 4 in the control track 2 is displaced to the extraction position shown in FIG. 2. In this process, the movable holder 4 first slides to the left along the horizontal portion 2' of the control track 2, until the extraction cup 5 is located precisely vertically below an extraction piston 11. The cross section of the extraction piston 11 corresponds precisely to the internal dimension of the cavity 5' of the extraction cup 5. A detachable filter 12 is disposed at the very bottom of the extraction piston 11, and there is a seal 14 just above it. Movable holder 4 moves out of the outset position of FIG. 1 to the extraction position of FIG. 2, sliding upward along the vertical portion 2" of the control track, performing several operations simultaneously. In one of the operations, the ground coffee is compressed into a cake between the two filters 6 and 12, and in another operation, a hot water inlet neck 8 disposed permanently on the extraction cup 5 and having seal 9 sealingly engages a corresponding coupling socket of the hot water heater 10. The actual extraction process then occurs. To this end, a metered quantity of heated water flows out of the hot water heater 10 through the hot water inlet neck 8, through bores (not shown) disposed in the bottom of the extraction cup 5, into the region below the movable filter 6. The heated water flows through the movable filter 6, the compressed ground coffee, and upper filter 12 located above the compressed ground coffee on the extraction piston 11, and rises again through bores (not shown) in the extraction piston 11 to its outlet 13. From there, the resulting coffee flows into cups furnished for the purpose. The remaining, now-extracted ground coffee forms a so-called filter cake 17. Before the extraction cup 5 is moved back to its outset position shown in FIG. 1, an extensible stop 15 disposed in the mounting plate 1 is thrust into the path of the tappet 7. This does not require a separate drive mechanism, but can be tripped purely mechanically by the motion of the movable holder 4. Once the extensible stop 15 has been extended, as shown in FIGS. 3 and 4, the tappet 5 continues to be held at the top during the downward motion of the extraction cup 5 when the movable holder 4 moves downward in the vertical portion 2" of the control track 2. In this process, the extraction cup 5 is displaced downward relative to the movable filter 6 by the depth of its cavity 5', so that the filter cake 17 now rests flush on the top of the upper edge of the extraction cup 5 as shown in FIG. 3. During this downward vertical motion of the extraction cup, the hot water inlet neck 8 disengages from the coupling socket of the hot water heater 10. To simplify control, in accordance with a preferred embodiment of this invention, the inlet neck 8 actuates an inlet valve as it engages the coupling socket of the hot water heater 10. As a result, a separate control mechanism for the water inlet valve is not required. If this valve is designed as a check valve, then it also closes again automatically upon decoupling.

The extraction cup 5 reaches the position of FIG. 4 by a horizontal motion of the movable holder 4 along the horizontal portion 2' of the control track 2. In this horizontal motion, the tappet 7 slides along the extensible stop 15. The extensible stop 15 approximately corresponds in width to the outside diameter of the extraction cup 5. During the horizontal motion, the extraction cup 5 slides with pinpoint accuracy beneath a scraper 16 permanently disposed on the mounting plate 1. As extraction cup 5 moves horizontally by the horizontal motion of movable holder 4 along the horizontal portion 2' of control track 2 the scraper 16 pushes the filter cake 17 off the movable filter 6 and drops it into a suitably provided collection container. The scraper 16 can additionally be provided with a rubber blade 18, which simultaneously cleans remaining particles of the coffee grounds from the movable filter 6. As the extraction cup 5 moves along the control track to the right toward the outset position, the tappet 7 slides downward from the stop 15, and the filter 6 and tappet 7 automatically reach the outset position due to gravity. If gravity proves to be inadequate, because of the increased friction of the tappet 7 in the seal (not shown), then, in accordance with another embodiment of this invention, a suitable spring provides additional help. Other passive mechanical solutions are also conceivable, in which the active motion of the extraction cup holder can be exploited. Once again, the movable holder 4, in its displacement toward the outset position, returns the extensible stop 15 to its original retracted position.

The device is now ready for another cycle.

As is apparent from the above description, the entire mechanical course of motion necessary to perform the extraction is reduced to the L-shaped motion of the movable holder 4 on which the extraction cup 5 is mounted. As a result, the entire structure of the device according to this invention is simplified considerably, and the potential danger of defects is reduced. A further advantage is the extraordinary ease of maintenance. The extraction cup 5 can be removed from the movable holder 4 with a single manipulation. The extraction cup 5, the movable filters and the tappet secured to the extraction cup 5 can be rinsed out without difficulty and replaced in the device. The filter 12 secured to the detachable extraction piston 1 is also easily accessible and can likewise be cleaned without difficulty. Finally, the scraper 16 with the rubber blade 18 is equally readily accessible and can be cleaned with a moist cloth without difficulty. Parts of the filter cake 17 that might drop onto the extensible stop 15 in the scraping process are automatically scraped from the extensible stop 15 when it is retracted into the mounting plate 1. The seals, which may have to be replaced occasionally, are also readily accessible.

In accordance with another embodiment of this invention, the extraction cup 5 is heated electrically. In a preferred embodiment of this invention, the heater of the extraction cup 5 is turned on only in the outset position of extraction cup 5, providing additional safety. The electrical connection is formed by a simple electric plug inserted and pulled out as a result of the horizontal motion. Heating in the extraction position can be done simultaneously by the hot water heater 10 in accordance with a known pattern. This assures optimal temperature guidance.

For safety reasons, an end switch is provided, which ascertains whether the extraction cup 5 is present in the outset position, so that a cycle cannot begin if the cup has been removed for cleaning. Such a switch also monitors the presence of the extraction piston 11. Only when both series-connected switches are closed is a cycle capable of being started.

As already mentioned, the control track need not be subdivided into horizontal and vertical portions in the way shown in the example illustrated. The control track 2 should merely extend rectilinearly in the region in which the extraction cup and the extraction piston engage one another. Thus, in accordance with another embodiment of this invention, the control track has a curved course.

I claim:

1. In a device for preparing hot beverages by extraction having a beverage powder processing and metering unit (3), a hot water heater (10) with a metering pump and expulsion means for removing the used beverage powder from a movable extraction cup (5), the improvement comprising: an extraction cup (5) detachably secured to a movable holder (4), said movable holder (4) guided in a control track (2) having two end positions whereby the extraction cup (5) executes a horizontal motion (2') and a vertical (2") motion, a filter (6) displaceably supported in the extraction cup (5), a permanently mounted scraper (16) positioned between the end positions of the control track (2) and outside said control track (2) a hot water inlet neck (8) permanently secured to the extraction cup (5), said hot water inlet neck (8) provided with a seal (9) and sealingly engaging a coupling socket in the hot water heater (10) whenever said extraction cup (5) is in an extraction position, and an extraction piston (11) cooperating with said extraction cup (5) permanently mounted whereby, in an extraction position, said extraction piston (11) protrudes sealingly into said extraction cup (5) and compresses the beverage powder disposed therein.

2. In a device in accordance with claim 1, wherein the filter (6) in the extraction cup (5) is connected to a tappet (7), which during a movement of the extraction cup (5) along control track (2) keeps the filter (6) at the top of extraction cup (5) by an extensible stop (15) disposed below said tappet (7), whenever the extraction cup (5) is lowered in a return movement.

3. In a device in accordance with claim 1, wherein the control track (2) has an L-shaped course.

4. In a device in accordance with claim 1, wherein in an outset position, the extraction cup (5) is located under the beverage powder processing and metering unit (3).

5. In a device in accordance with claim 1, wherein the permanently mounted scraper (16) is provided with a replaceable rubber blade.

* * * * *